United States Patent
Avins

[11] 3,938,181
[45] Feb. 10, 1976

[54] AUTOMATIC LUMINANCE CHANNEL FREQUENCY RESPONSE CONTROL APPARATUS

[75] Inventor: Jack Avins, Princeton, N.J.
[73] Assignee: RCA Corporation, New York, N.Y.
[22] Filed: Oct. 21, 1974
[21] Appl. No.: 516,589

[52] U.S. Cl.................... 358/38; 358/37; 178/7.3 R; 178/DIG. 25; 178/DIG. 34
[51] Int. Cl.²......................................... H04N 5/14
[58] Field of Search............. 358/37, 38; 178/7.3 R, 178/7.5 R, DIG. 19, DIG. 34, DIG. 25; 333/70 T, 18, 28 R

[56] References Cited
UNITED STATES PATENTS

| | | | |
|---|---|---|---|
| 2,759,044 | 8/1956 | Oliver | 178/7.5 R |
| 2,922,965 | 1/1960 | Harrison | 333/28 R |
| 3,752,916 | 8/1973 | Lowry et al. | 178/7.3 R |
| 3,858,240 | 12/1974 | Golding et al. | 358/13 |

Primary Examiner—Howard W. Britton
Assistant Examiner—John C. Martin
Attorney, Agent, or Firm—E. M. Whitacre; P. M. Emanuel

[57] ABSTRACT

A delay line suitable for television video signals is included in the luminance channel of a television video signal processing apparatus. A plurality of taps are coupled to the delay line for developing a plurality of delayed video signals. At least a first and a second of the delayed video signals are combined in first combining means to produce a first combined signal which determines the peaking characteristics of the luminance channel. A bandwidth determining signal is derived from at least a third one of the delayed video signals located in time between the first and the second delayed video signal. A second bandwidth determining signal is derived from at least a fourth and a fifth of the delayed video signals located in time between the first and the second delayed video signals. One of the bandwidth determining signals and the first combined signal are combined in a second combining means to produce a second combined signal. The first and second bandwidth determining signals are combined to produce a third bandwidth determining signal which includes controllable amplitude portions of the first and second bandwidth determining signals. The third bandwidth determining signal controls the overall bandwidth characteristics of the luminance channel. The third bandwidth determining signal and the second combined signal are combined to produce an output signal. In one embodiment, the formation of the third bandwidth determining signal is dynamically controlled in response to a signal representing the amount of color information contained in the video signals so as to increase the bandwidth of the luminance channel when the amount of color information is relatively low to thereby improve the fine detail resolution and transient response of the receiver.

18 Claims, 6 Drawing Figures

AUTOMATIC LUMINANCE CHANNEL FREQUENCY RESPONSE CONTROL APPARATUS

This invention relates to apparatus for improving the transient response and fine detail resolution of television video signal processing systems, and particularly relates to apparatus for automatically controlling the frequency response of television video signal processing systems.

The advent of larger kinescopes for television receivers has given increased importance to the problem of improving the transient response of television video signal processing systems. In terms of picture quality, this improvement corresponds to improving transitions between tones as well as the reproduction of fine detail.

Color television composite signals contain luminance, chrominance, synchronizing and sound signal components. The luminance signals have a relatively wide bandwidth (e.g., approximately 4 MHz) with a lower frequency range extending down to direct current (zero frequency). The higher frequency range of the composite signals (e.g., 2–5 MHz) also includes chrominance and sound signals. The chrominance signals have the form of a modulated color subcarrier signal and are arranged in frequency in relation to the frequency (e.g., 3.58 MHz) of the color subcarrier signal. The sound signals have the form of a modulated sound intercarrier signal and are arranged in frequency in relation to the frequency (e.g., 4.5 MHz) of the sound intercarrier signal. The sharp transition and fine detail information of the image is contained in the relatively high frequency signal components of the luminance signals. To process these signals, color television receivers include a chrominance channel for processing the chrominance signals, a luminance channel for processing the luminance signals and a sound channel for processing the sound signals.

In order to improve the sharpness and fine detail resolution of the image, it is desirable to improve the high frequency response of the luminance channel by providing the luminance channel with a relatively wide bandwidth or by relatively accentuating the amplitudes of the high frequency components of the luminance signals or both. Accentuating the amplitudes of relatively high frequency components of the luminance signals is often called peaking. Widening the bandwidth of the luminance channel tends to result in the reproduction of sharper amplitude transitions. Peaking the luminance signals tends to result in the generation of a "preshoot" just before a transition and an "overshoot" just after the transition, so that, for example, a transition from white to black will be accentuated because the portion of the reproduced image just before the transition is whiter than it is in the original scene and just after the transition is blacker than it is in the original scene.

However, the high frequency response of the luminance channel is usually purposely limited, by means of band elimination filters or the like, to remove those frequency components corresponding to chrominance and sound signals from the luminance channel because the presence of chrominance and sound signals in the luminance channel tends to produce visible patterns in the image which may be annoying to the viewer. Thus, in present day color television receivers, a compromise is generally made between a luminance channel having a maximized high frequency response for fine detail resolution and sharp tonal transitions, and a luminance channel having a limited high frequency response to inhibit the generation of undesirable visible patterns in the image.

Since undesirable visible patterns will not be readily generated when the luminance channel is relatively free of signals such as chrominance signals and sound signals, apparatus have been proposed for automatically controlling the bandwidth of the luminance channel in accordance with the amount of undesirable signals present in the luminance channel. Such apparatus are described in U.S. Pat. Nos.: 2,895,004, entitled, "Color Television," issued to G. L. Fredendall on July 14, 1959, and assigned to the same assignee as the present invention; 2,905,751, entitled, "Monochrome Channel Bandwidth Modifying Apparatus for Color Television," issued to G. Ralston on Sept. 22, 1959; 2,910,528, entitled, "Burst Control of Color Television Receiver Bandwidth," issued to O. E. Peterson on Oct. 27, 1959; 3,139,484, entitled, "Compatible Color Television Apparatus," issued to D. Richman on June 30, 1964; 3,167,611, entitled, "Color Television Apparatus for Improving Resolution During Monochrome Reception," issued to K. M. St. John on Jan. 26, 1965; and 3,749,824, entitled, "Suppression Filter for Carrier-Chrominance Signals Utilizing a Tapped Delay Line," issued to T. Sagashima et al., on July 31, 1973.

Care must be taken in choosing the apparatus to improve the high frequency response of the video processing system. This is so whether such high frequency response is fixed or is automatically adjusted in response to a control signal. For example, video processing systems having a relatively wide bandwidth may produce a less sharp image than narrower bandwidth systems because the wide bandwidth systems may exhibit phase non-linearity or distortion as a function of frequency. That is, because wide bandwidth systems generally have a steeper high frequency roll-off characteristic (increasing signal attenuation with increasing frequency) than narrower bandwidth systems, high frequency video signal components may be delayed more than lower frequency video signal components. Phase distortion or non-linearity is primarily manifested by the presence of undesirable unsymmetrical preshoots and overshoots and ringing in the processed video signals. Unsymmetrical preshoots and overshoots and ringing are particularly undesirable since they are generally not readily controllable and produce visible effects which are not pleasing to the viewer. Similarly, care must be taken to avoid uncontrolled phase distortion in peaking apparatus for accentuating the amplitudes of high frequency components of the luminance signals. In that case, too, the images generated in accordance with the processed video signals may not be pleasing to the viewer because of ringing and uncontrolled preshoots and overshoots. As a result of such phase distortion, the transient response and fine detail resolution of video processing systems having provisions for improving the high frequency response of the system may be poorer than would be expected.

It is known that a desired amplitude or phase characteristic (or both) as a function of frequency may be formed in an apparatus wherein delayed signals generated at signal coupling points (usually referred to as taps) along a delay line or like device are combined in a predetermined manner to obtain the desired characteristic. Such apparatus are generally described in U.S. Pat. No. 2,263,376, entitled, "Electric Wave Filter, or the Like," issued to A. D. Blumlein et al., on Nov. 18, 1941; an article entitled, "Transversal Filters," by H. E. Kallman, appearing in the *Proceedings of the I.R.E.*, Volume 28, Number 7, pages 302–310, July 1940; an article entitled, "Selectivity and Transient Response Synthesis," by R. W. Sonnenfeldt, appearing in *I.R.E. Transactions on Broadcast and Television Receivers*, Volume BTR-1, Number 3, pages 1–8, July 1955; and an article entitled, "A Transversal Equalizer for Television Circuits," by R. V. Sperry and D. Surenian, appearing in Bell System Technical Journal, Volume 39, Number 2, pages 405–422, March 1960.

Such apparatus, sometimes called a transversal equalizer or filter, is generally useful for a variety of applications in the signal processing field. For instance, such apparatus may be found useful in horizontal and vertical aperture beam correction, as is described in U.S. Pat. No. 2,759,044, entitled, "Beam Aperture Correction in Horizontal and Vertical Direction," issued to B. M. Oliver on August 14, 1956.

Furthermore, U.S. Pat. No. 3,749,824, noted above, describes an apparatus wherein a reflective termination is selectively coupled to one end of a luminance channel delay line in response to a control signal representing the amount of color information in the video signals in a manner to suppress chrominance signal portions. The delay line is also described as serving to compensate for the time delay differential of signals processed in the luminance and chrominance channels.

In a co-pending and related patent application Ser. No. 486,241, entitled, "Television Signal Processing Apparatus," of Joseph Peter Bingham, filed July 5, 1974, and assigned to the same assignee as the present invention, apparatus is described for relatively increasing the amplitudes of high frequency components of the luminance signal portions while relatively attenuating the amplitudes of chrominance or sound signal signal portions or both. The apparatus includes a delay line responsive to television video signals which is provided with a plurality of taps to generate a plurality of delayed video signals. The delayed video signals are combined to generate a particular desired response characteristic for the luminance channel.

The apparatus provides for an improved transient response consistent with the attenuation of undesirable signals which would, without their attenuation, normally produce undesirable visible patterns. The apparatus also provides for readily controllable preshoots and overshoots. The apparatus further provides for an adjustment for controlling the amplitude of the peak of the amplitude versus frequency characteristic of the output signal which does not substantially affect the amplitudes of the DC components of the amplitudes of frequency components around a frequency $f$ such as the chrominance or sound subcarrier frequency. Further, the apparatus is arranged so that a portion of the delay line can be utilized for equalizing the time delay differentials of the signals processed in the chrominance and luminance channels.

The present invention is useful in an apparatus for automatically controlling the frequency location of predetermined amplitude points of the amplitude versus frequency transfer characteristic of a television video signal processing system.

In accordance with the present invention, a plurality of signal coupling means are coupled to a signal delaying means which is responsive to video signals. A plurality of delayed video signals are developed at the signal coupling means. A first combined signal is produced by combining at least a first and a second of the delayed video signals being spaced apart in time by a time interval substantially equal to $NT/2$, where T is the period of a predetermined signal component of the video signals and N is an integer greater than one. A first bandwidth determining signal is derived from at least a third of the delayed video signals. A second bandwidth determining signal is derived from at least a fourth and a fifth of the delayed video signals being located in time between the first and second delayed video signals. A second combined signal is produced by combining one of the bandwidth determining signals with the first combined signal. A third bandwidth determining signal is derived by selectively combining controllable amplitude portions of the first and second bandwidth determining signals. The second combined signal is combined with the third bandwidth determining signal to produce an output signal. The bandwidth of the output signal is determined by the third bandwidth determining signal, while the peaking characteristic of the output signal is determined by the first combined signal.

In accordance with another aspect of the present invention, the controllable amplitude portions of the first and second bandwidth determining signals are controlled in inverse relationship to one another in response to a control signal.

In accordance with still another aspect of the present invention, the control signal is representative of the amount of color information present in the video signals. With respect to this aspect, the controllable amplitude portion of the first bandwidth determining signal is controlled in inverse relationship to the amplitude of the color information, and the controllable amplitude portion of the second bandwidth determining signal is controlled in direct relationship to the amplitude of the color information.

In accordance with still another aspect of the present invention, the first combined signal is produced by combining a controllable amplitude portion of the sum of the first and second delayed video signals and a controllable amplitude portion of the sum of a sixth and a seventh delayed video signals being located in time between the first and second delayed video signals. With respect to this aspect, the controllable amplitude portions of the respective sum signals may be automatically controlled in accordance with a control signal.

These and other aspects of the present invention will be best understood by the following detailed description in conjunction with the accompanying drawing, in which.

Figure 1:
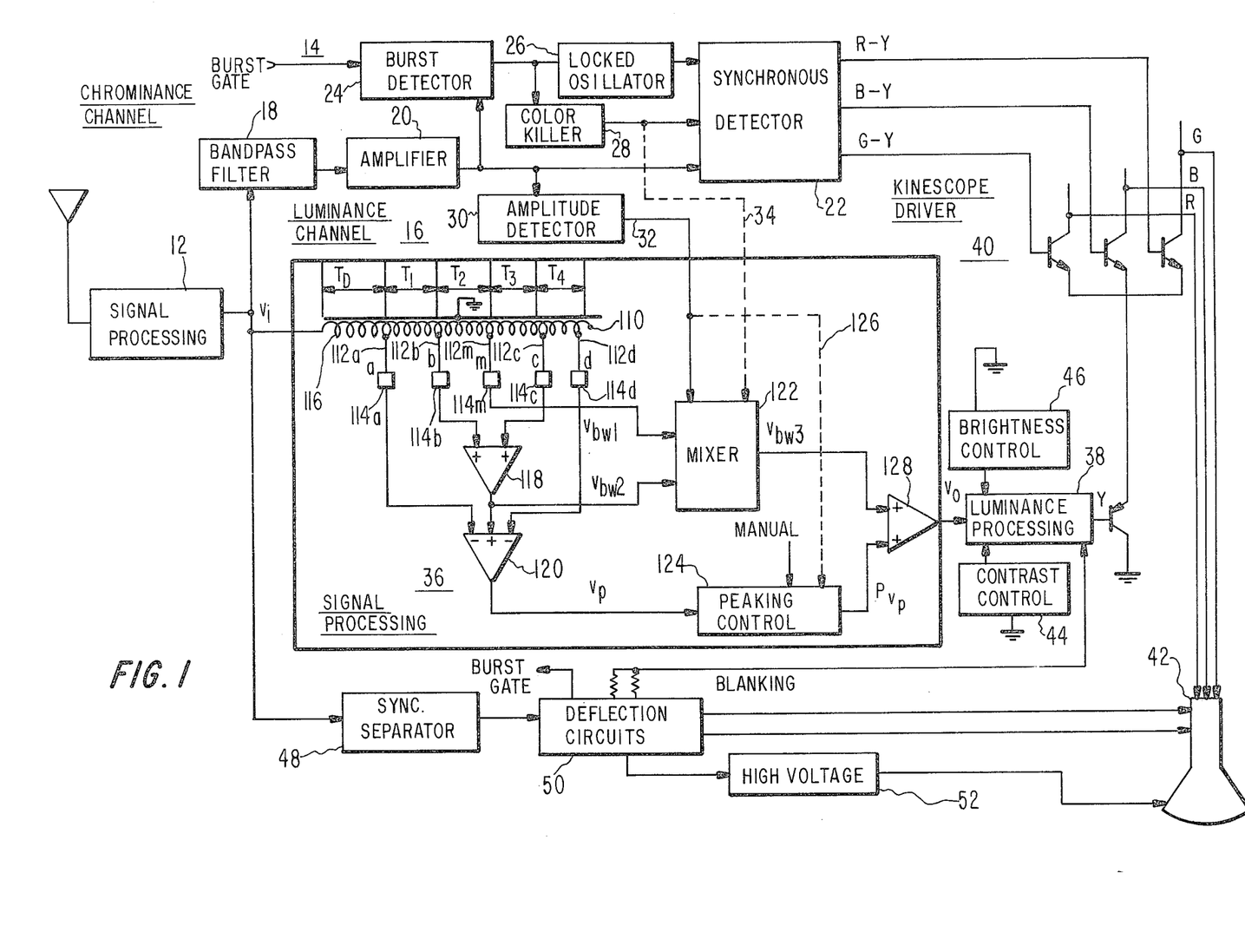
FIG. 1 of the drawing shows, partially in block diagram form and partially in schematic diagram form, the general arrangement of a color television receiver employing the embodiment of the present invention.

Referring now to FIG. 1, the general arrangement of a color television receiver employing the present invention includes a signal processing unit 12 responsive to radio frequency (RF) television signals received by an antenna, for generating, by means of suitable intermediate frequency circuits (not shown) and detection circuits (not shown), a composite video signal comprising chrominance, luminance, sound and synchronizing signals. The output of signal processing unit 12 is coupled to a chrominance channel 14 and a luminance channel 16.

Chrominance channel 14 includes a bandpass filter 18 which serves to extract signals in the frequency range (e.g., approximately 2.1 MHz to 4.2 MHz) of the chrominance signals from the composite video signal. The output signal of bandpass filter 18 is amplified by an amplifier 20 and then is coupled to a synchronous detector 22. The output signal of amplifier 20 is also coupled to a burst detector 24 together with a burst gate signal generated by deflection circuits 50. The burst gate signal comprises pulses synchronized in relation to the synchronization pulses produced by a sync separator 48 and represents the time location of color burst signals included in the composite video signal. Burst detector 24 serves to extract the color burst signals from the output signal of amplifier 20. The color burst signals represent color phase reference information required to demodulate the chrominance signals. The color burst signals are coupled to a locked oscillator 26 which serves to generate a signal having the same frequency (e.g., 3.58 MHz) as the color subcarrier signal and being phase locked to the phase of the burst signals. Various known schemes for locking oscillator 26 may be employed. The output signal of the locked oscillator 26 is coupled to synchronous detector 22 where it is used to provide color phase reference signals, for instance, I (in phase) and Q (quadrature) signals. Synchronous detector 22 serves to demodulate the chrominance signals and ultimately to derive color-signals representing, for example, R-Y, B-Y and G-Y information.

A color killer circuit 28 is coupled to the output of burst detector 24 and serves to generate a signal to inhibit the operation of synchronous detector 22 (or other portions of the chrominance channel 14) when the amplitude of the burst signal is below a predetermined threshold level.

An amplitude detector 30 is coupled to the output of amplifier 20 and serves to generate a chrominance passband amplitude signal representing the amplitude of the signals in the chrominance frequency range. The chrominance passband amplitude signal is indicative of the amount of color information in the video signal and is coupled through a conductor 32 to a signal processing unit 36 to control its operation. Similarly, the output of color killer circuit 28 may also be coupled to signal processing unit 36, as is indicated by a dotted line 34.

Signal processing unit 36 is included in luminance channel 16 and serves to attenuate undesirable signals present in luminance channel 16 such as chrominance or sound signals or both, while relatively accentuating or peaking the amplitudes of high frequency components of the luminance signals to improve the transient response and fine detail resolution of the television receiver. Signal processing unit 36 includes provisions for automatically controlling the bandwidth of luminance channel 16 in response to control signals generated in chrominance channel 14. Signal processing unit 36 may also have provisions for controlling the amplitude of a peaked portion of the luminance channel frequency response in response to manual control signals or control signals generated in chrominance channel 14. Furthermore, signal processing unit 36 may also serve to equalize the time delays of the signals processed in chrominance channel 14 and luminance channel 16.

The output signals of signal processing unit 36 are coupled to a luminance processing unit 38 which serves to amplify and otherwise process the luminance signals to produce the output signal, Y, of luminance channel 16.

The Y output signal of luminance channel 16 and the R-Y, G-Y and B-Y color difference output signals of chrominance channel 14 are coupled to a kinescope driver 40, where they are matrixed to form R, G and B color signals. The R, G and B color signals drive a kinescope 42.

A contrast control unit 44 is coupled to luminance processing unit 38 to control the amplitude of the luminance signals and thereby control the contrast of the images produced by kinescope 42. A brightness control unit 46 also is coupled to luminance processing unit 38. Suitable contrast and brightness control arrangements are described in U.S. Pat. No. 3,804,981, entitled, "Brightness Control," by Jack Avins, issued Apr. 16, 1974, and assigned to the same assignee as the present invention.

Another portion of the output signal of video processing unit 12 is coupled to sync separator 48 which separates horizontal and vertical synchronization pulses from the video signal. The synchronization pulses are coupled from sync separator 48 to deflection circuits 50. Deflection circuits 50 are coupled to kinescope 42 and to a high voltage unit 52 to control the deflection or sweep of an electron beam in kinescope 42 in a conventional manner. Deflection circuits 50 also generate blanking signals which are coupled to luminance processing unit 38 to inhibit the output of luminance processing unit 38 during the horizontal and vertical retrace periods to insure cutoff of kinescope 42 during these respective periods. Horizontal deflection circuits 50 also generates the burst gate signal which is coupled to burst detector 24.

A channel (not shown) is also provided for processing sound signals.

The general circuit arrangement shown in FIG. 1 is suitable for use in a color television receiver of the type shown, for example, in RCA Color Television Service Data 1970 No. T19 (a CTC-49 type receiver), published by RCA Corporation, Indianapolis, Ind.

Signal processing unit 36 includes signal delaying means 110, shown as a delay line, and a plurality of signal coupling means or taps 112a, 112b, 112m, 112c and 112d coupled to delay means 110 at successive points. The combination of signal delaying means 110 and taps 112a, 112b, 112m, 112c and 112d, is sometimes referred to as a tapped delay line. Although delay means 110 is shown as an inductive or coil type of delay line, it may be any other suitable device for delaying a video signal such as an array of charge coupled devices (CCD's) or charge transfer devices. Although taps 112a, 112b, 112m, 112c and 112d are shown as being directly connected to delay line 110, they may be coupled to the delay line in any other suitable manner providing for signal coupling such as capacitive coupling or the like.

Taps 112a, 112b, 112m, 112c and 112d are coupled to delay line 110 at spaced intervals to develop respective delayed video signals a, b, m, c and d delayed in time in relation to the input video signal, $v_i$, by respective time intervals $T_D$, $T_D+T_1$, $T_D+T_1+T_2$, $T_D+T_1+T_2+T_3$, and $T_D+T_1+T_2+T_3+T_4$. Delay line 110 includes a portion 116 having a time delay interval $T_D$, prior to tap 112a, selected with respect to other portions of delay line 110 for equalizing the time delays of the signals processed in the luminance channel 16 and the chrominance channel 14. For the purpose of equalizing the time delays of the signals processed in the chrominance and the luminance channels, it is desirable that the sum of $T_D$, $T_1$ and $T_2$ equal the difference between the time delays of the signals processed in the chrominance channel 14 and the luminance channel 16. In addition, it should be noted that a signal resulting from the combination of signals developed at taps symmetrically disposed around a given point of a delay line may be considered to have a time delay equal to the average of the time delays of the combined signals. Therefore, if taps 112a, 112b, 112c and 112d are symmetrically disposed around tap 112m, the output signal derived by combining signals developed at taps 112a, 112b, 112m, 112c and 112d also will have a time delay which is equal to the time delay required to equalize the time delays of the signals processed in the chrominance and luminance channels.

Taps 112a, 112b, 112m, 112c, and 112d are respectively coupled to amplitude controlling or signal weighting means 114a, 114b, 114m, 114c and 114d. Amplitude controlling means 114 serve to modify the amplitudes of delayed video signals a, b, m, c, and d by respective predetermined gain or weight values to generate a plurality of respective amplitude controlled or weighted signals. Amplitude controlling means 114a, 114b, 114m, 114c and 114d may be formed by any suitable gain control circuit, including, for example, an amplifier or an attenuator, wherein the gain may be set to predetermined values above and below unity.

The amplitude controlled signals produced by amplitude controlling means 114b and 114c are coupled to a summing circuit 118 where they are algebraically added to produce an output signal $v_{bw2}$. As will be seen, the signal $v_{bw2}$ is useful to determine the bandwidth of the output signal, $v_o$, of signal processing unit 36. Thus, the subscript "bw" is used to denote "bandwidth." Summing circuit 118 may be formed by any suitable circuit for algebraically summing signals such as an operational amplifier, a restive matrix or the like. The amplitude controlled signals produced by the amplitude controlling means 114a and 114d are coupled to a summing circuit 120 together with $v_{bw2}$. Summing circuit 120 is similar to summing circuit 118 and serves to algebraically subtract the amplitude controlled signals produced by amplitude controlling means 114a and 114d from $v_{bw2}$ to produce signal $v_p$. As will be seen, the signal $v_p$ is useful to determine the "peaking" characteristics of the output signal of signal processing unit 36. Thus, the subscript "p" denotes "peaking."

It should be noted that although amplitude controlling means 114a, 114b, 114m, 114c and 114d are shown coupled to each tap 112a, 112b, 112m, 112c and 112d to show the general functional arrangement of signal processing unit 36, they may not be specifically provided in all cases. Thus, for example, if a predetermined gain value equal to 1 is desired, the particular amplitude controlling means may be only a direct connection between the respective tap and summing circuit. Furthermore, amplitude controlling means 114a, 114b, 114m, 114c and 114d may be included in summing circuits 118 and 120.

The amplitude controlled signal produced by amplitude controlling means 114m and the output signal of summing circuit 118 are coupled to a mixer unit 122. As will be seen, the amplitude controlled signal produced by amplitude controlling means 114m also is useful to determine the bandwidth of the output signal of signal processing unit 36 and is therefore indicated as $v_{bw1}$. A control signal from channel 14 is also coupled to mixer unit 122 through conductor 32 or 34. Mixer unit 122 produces an output signal $v_{bw3}$ comprising the combination of a controlled amplitude portion of $v_{bw1}$ and $v_{bw2}$. The controlled amplitude portions of $v_{bw1}$ and $v_{bw2}$ are controlled in accordance with the control signals from chrominance channel 14. Specifically, $v_{bw3}$ is equal to the sum of a controlled amplitude portion of $v_{bw1}$ and a controlled amplitude portion of $v_{bw2}$, the controlled amplitude portions of $v_{bw1}$ and $v_{bw2}$ being controlled in an inverse relationship to one another. As will be seen, it is desirable that the controlled amplitude portion of $v_{bw1}$ be controlled in inverse relationship to the amount of color information and that the controlled amplitude portion of $v_{bw2}$ be controlled in direct relationship to the amount of color information to effect automatic bandwidth control of luminance channel 16 in accordance with the amount of color information present in the composite video signal.

Figure 2:
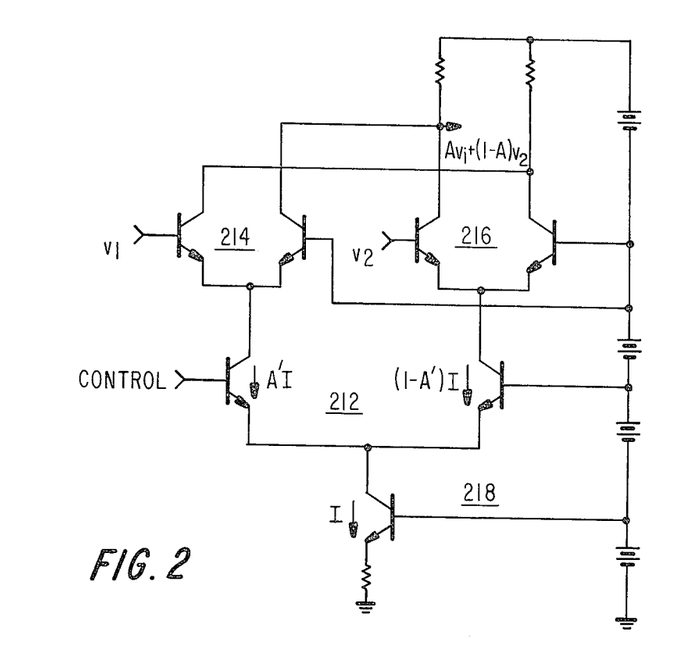
FIG. 2 shows a schematic diagram of an implementation of a portion of the embodiment of the present invention shown in FIG. 1.

FIG. 2 is a schematic diagram of a circuit implementation of mixer unit 122 wherein three transistor differential amplifier stages 212, 214, and 216 are arranged in a multiplier or "tree" configuration to produce an output signal of the form $Av_1+(1-A)v_2$, where $v_1$ and $v_2$ are two input signals and A is the overall gain of the circuit. A relatively constant current I is generated by a constant current source 218 including transistor 220. Various known temperature compensated and supply voltage compensated current sources may be used. The current I divides between the two branches of differential stage 212 to form currents $A'I$ and $(1-A')I$, where $A'$ is the single ended gain of differential stage 212. The single ended gain $A'$ of differential stage 212 is controlled in accordance with the amplitude of the control signal applied to differential stage 212. The currents $A'I$ and $(1-A')I$ are respectively coupled to differential stages 214 and 216 and determine their respective gains. The non-inverting or positive single ended output signal of differential stage 214 is added to the inverting or negative single ended output signal of differential stage 216 to form the output signal.

It will be appreciated that $v_{bw1}$, $v_{bw2}$ and the chrominance passband amplitude signal from chrominance channel 14 of FIG. 1 may be connected to the appropriate terminals of the circuit of FIG. 2 so that a signal of the form $Av_{bw1}+(1-a)v_{bw2}$ is produced where the controlled amplitude portions of $v_{bw1}$ and $v_{bw2}$ are controlled in inverse relationship to one another in response to the chrominance passband amplitude signal.

It should be noted that the circuit of FIG. 2 may also be arranged to selectively switch its output signal between $v_{bw1}$ and $v_{bw2}$ under the influence of a signal such as the color killer signal or the like as indicated by dotted line 34 in FIG. 1.

Returning now to FIG. 1, the output signal, $v_p$, of summing circuit 120 is coupled to peaking control circuit 124 which serves to modify the amplitude of $v_p$ to produce a signal $Pv_p$, where P is the gain (or attenuation factor) of peaking control circuit 124. Peaking control circuit 124 may be formed by any suitable adjustable gain device such as a variable gain amplifier and may be arranged to produce a range of gains extending from values less than unity to values greater than unity. The gain, P, of peaking control circuit 124 may be manually adjusted or controlled in response to a control signal such as the chrominance passband amplitude signal as is indicated by dotted conductor lead 126. Preferably, signal processing unit 36 is arranged so that its amplitude versus frequency transfer characteristic has a peak at a relatively high frequency near the frequency range of the chrominance signals. It is desirable to control the amplitude of the peak of the amplitude versus frequency response characteristic in reverse relationship to the amount of color information in the video signal.

The output signal, $Pv_p$, of peaking control circuit 124 and the signal $v_{bw3}$ are coupled to a summing circuit 128. Summing circuit 128 is similar to summing circuits 118 and 120 and serves to algebraically add $Pv_p$ and $v_{bw3}$ to produce the output signal, $v_o$, of signal processing unit 36.

It should be noted that peaking control circuit 124 may not be required in applications where is is not desired to adjust the amplitude of the peak of the amplitude versus frequency response characteristic of signal processing unit 36 and for these applications $v_p$ may be directly coupled to summing circuit 128.

Figure 3:
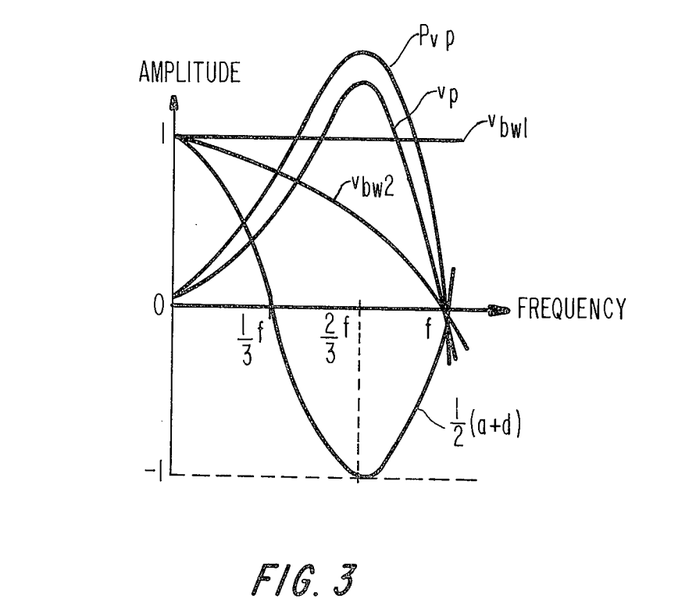
FIGS. 3 and 4 show graphical representations of various amplitude versus frequency transfer characteristics associated with the embodiment of the present invention shown in FIG. 1.
Figure 4:
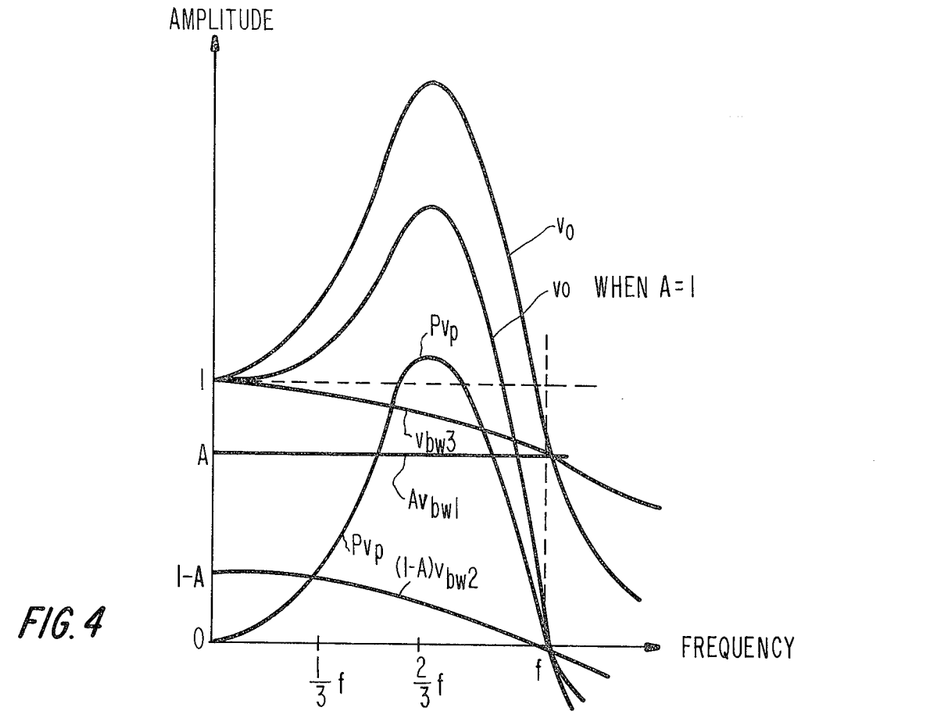

The operation of signal processing unit 36 of FIG. 1 may be best understood with reference to FIGS. 3 and 4, which are graphical representations of amplitude versus frequency transfer characteristics associated with signal processing unit 36.

Before describing FIGS. 3 and 4, the amplitude versus frequency transfer characteristics of a tapped delay line or similar device will be briefly discussed. The amplitude versus frequency transfer characteristic of a portion of a delay line which contributes a time delay T to applied signals may be expressed as a coefficient which varies exponentially as a function of frequency, i.e., $e^{-j\omega t}$, e being the natural logarithm base. It should therefore be appreciated that the amplitude versus frequency transfer characteristic associated with a signal produced by algebraically adding two signals generated at respective taps symmetrically located about a reference point varies as a cosine function.

The operation of signal processing unit 36 of FIG. 1 will be explained by way of example wherein the pairs of taps 112a, 112d and 112b, 112c are located symmetrically around tap 112m and the time intervals $T_1$, $T_2+T_3$ and $T_4$ are all equal to $1/(2f)$, where $f$ is the frequency of a signal component of the composite video signal, $v_i$, which may undesirably be present in luminance channel 16 of FIG. 1. For instance, f may be the frequency of a signal in the range of frequencies of the chrominance or sound subcarriers or both. More specifically, $f$ may be the color subcarrier frequency (e.g., 3.58 MHz) or the sound intercarrier frequency (e.g., 4.5 MHz). Further, by way of example, the predetermined gain values of amplitude controlling means 114a, 114b, 114m, 114c and 114d typically have respective values of ½, ½, 1, ½ and ½.

In FIG. 3 there are shown graphical representations of amplitude versus frequency transfer characteristics associated with signals $v_{bw1}$, $v_{bw2}$, $v_p$ and $Pv_p$ generated within signal processing unit 36 and from which output signal $v_o$ is produced. These amplitude versus frequency transfer characteristics are labeled $v_{bw1}$, $v_{bw2}$, $v_p$, and $Pv_p$ for convenience. With the example values given above, the signals $v_{bw1}$, $v_{bw2}$, $v_p$ and $Pv_p$ are derived from delayed video signals $a$, $b$, $m$, $c$ and $d$ by signal processing unit 36 according to the following expressions:

$$v_{bw1} = m \qquad (1)$$
$$v_{bw2} = \tfrac{1}{2}(b+c) \qquad (2)$$
$$v_p = \tfrac{1}{2}(b+c)-\tfrac{1}{2}(a+d) \qquad (3)$$
$$Pv_p = P[\tfrac{1}{2}(b+c)-\tfrac{1}{2}(a+d)] \qquad (4)$$

In FIG. 3 there is also shown a graphical representation of the amplitude versus frequency characteristic labeled [½(a+d)] associated with the summation of the amplitude controlled signals produced by amplitude controlling means 114a and 114d of FIG. 1.

In FIG. 3 is is seen that the amplitude versus frequency characteristic associated with $v_{bw1}$ is flat. It is also seen that the amplitude versus frequency transfer characteristic associated with $v_{bw2}$ is a cosine function having a recurrence rate of 4f and that the amplitude versus frequency transfer characteristic associated with ½(a+d) is a cosine function having a recurrence rate of 4f/3.

It is seen by examining FIG. 3 that the amplitude versus frequency transfer characteristic associated with $v_{bw1}$ (derived from delayed video signal $m$) has a relatively larger bandwidth than the amplitude versus frequency transfer characteristic associated with $v_{bw2}$ (derived from the summation of delayed video signals $b$ and $c$). As will be seen, the amplitude versus frequency transfer characteristic associated with $v_{bw3}$ (shown in FIG. 4) has a bandwidth which varies between the bandwidths of the amplitude versus frequency transfer characteristics associated with $v_{bw1}$ and $v_{bw2}$ in response to the control signal generated in chrominance channel 14. The amplitude versus frequency transfer characteristic associated with $v_{bw3}$, when combined with the amplitude versus frequency transfer characteristic associated versus frequency transfer characteristic associated with $Pv_p$, determines the bandwidth of luminance channel 16.

It can be seen by examining FIG. 3 that the amplitude versus frequency transfer characteristic associated with ½(a+d) has a negative maximum amplitude point at 2f/3. By examining expressions (2) and (3), it can be seen that $v_p$ is formed by subtracting ½(a+d) from $v_{bw2}$. From FIG. 3, it can be seen that the amplitude versus frequency transfer characteristic associated with $v_p$ has a peak amplitude at approximately 2f/3. Thus, the amplitude versus frequency transfer characteristic associated with the summation of delayed signals a and d is useful for determining the peaking characteristic of luminance channel 16.

It should be noted that it is desirable to space delayed video signals a and d apart in time by a time interval equal to NT/2, where N is an integer and T is the reciprocal of the frequency $f$. Although the preferred range of N includes integers between 2 and 5, other values of N may be useful in particular applications.

It should be noted that although $v_p$ is derived in signal processing unit 36 of FIG. 1 by algebraically subtracting the amplitude controlled signals produced by amplitude controlling means 114a and 114d from $v_{bw2}$, $v_p$ may be derived by algebraically subtracting the amplitude controlled signals produced by amplitude controlling means 114a and 114d from $v_{bw1}$ with similar results.

From an examination of FIG. 3 it can be seen that adjustment of P, i.e., the gain of peaking control circuit 124 of FIG. 1, does not affect the amplitude of the amplitude versus frequency transfer characteristic associated with $Pv_p$ at DC (i.e., zero frequency) or at the frequency $f$.

Signal processing unit 36 of FIG. 1 will further be explained by way of example wherein mixer 122 is of the type shown in FIG. 2 producing an output signal of the form:

$$v_{bw3} = Av_{bw1} + (1-A)v_{bw2} \qquad (5)$$

where $A$ is the controllable gain of the mixer of FIG. 2 and the amplitude versus frequency transfer characteristics $v_{bw1}$ and $v_{bw2}$ are as shown in FIG. 3. For this embodiment, the general expression for $v_o$ is:

$$v_o = Av_{bw1} + (1-A)v_{bw2} + Pv_p \qquad (6)$$

Referring now to FIG. 4, there are shown graphical representations of amplitude versus frequency transfer characteristics associated with $v_{bw3}$, $Av_{bw1}$, $(1-A)v_{bw2}$, $v_o$ in the general case and $v_o$ when A=0. In FIG. 4, the amplitude versus frequency transfer characteristic associated with $Pv_p$ is repeated from FIG. 3 for the purpose of relating the amplitude versus frequency transfer characteristics of FIGS. 3 and 4.

As the gain A is varied between 1 and 0, the amplitude versus frequency transfer characteristic associated with $v_{bw3}$ will correspondingly vary between the amplitude versus frequency transfer characteristics of $v_{bw1}$ and $v_{bw2}$. As may be seen from expressions (5) and (6), $v_o$ is the sum of $v_{bw3}$ and $Pv_p$. Therefore, the bandwidth of the amplitude versus frequency transfer characteristic associated with $v_o$ is controlled in accordance with the value of gain A. The amplitude versus frequency transfer characteristic corresponding to a minimum bandwidth of luminance channel 16 is exhibited when the value of A is equal to 0 (shown in FIG. 4). The amplitude versus frequency transfer characteristic of $v_o$ corresponding to a maximum bandwidth of luminance channel 16 is exhibited when the value of A is equal to 1 and $v_o$ is then equal to $Pv_p$ added to the flat transfer characteristic of $v_{bw1}$ having an amplitude of 1 (not shown in FIG. 4).

It is also seen from FIG. 4 that the value of the peak amplitude of the amplitude versus frequency transfer characteristic associated with $v_o$ varies in a direct relationship with the value of A. It is noted with respect to this aspect that although the peak amplitude of the amplitude versus frequency transfer characteristic associated with $v_o$ varies with A, the amplitude at DC does not. This is so because the amplitude of the sum of $(1-A) v_{bw2}$ and $Av_{bw1}$ at DC is always 1. Furthermore, it is noted that although the peak amplitude of the transfer characteristic associated with $v_o$ varies with P, the amplitude at DC does not. This is so because the amplitude contribution of the amplitude versus frequency transfer characteristic associated with $Pv_p$ to the amplitude versus frequency transfer characteristic associated with $v_o$ is always 0 at DC. It is desirable not to affect the amplitude of the amplitude versus frequency transfer characteristic since picture brightness is determined by the DC component of the luminance signals.

Thus, by controlling the formation of $v_{bw3}$ the bandwidth of signal processing unit 36 may be controlled. Specifically, when a control signal representing the amount of color information present in the video signal indicates a relatively large amount of color information $v_{bw3}$ primarily comprises the combination of two delayed signals (b and c) having an amplitude versus frequency transfer characteristic with a relatively large bandwidth. When the signal representing the amount of color information present in the video signal indicates a relatively small amount of color information, $v_{bw3}$ primarily comprises a delayed video signal (m) having an amplitude versus frequency transfer characteristic with a relatively large bandwidth.

With reference to FIGS. 3 and 4, it should be noted that the selection of time intervals $T_1$, $T_2+T_3$ and $T_4$ as 140 nanoseconds (i.e., one-half the reciprocal of the color subcarrier frequency, 3.58 MHz) may be advantageous since the amplitude versus frequency transfer characteristic associated with $v_o$ when luminance channel 16 is in a minimum bandwidth condition (i.e., with A=1) will have a peak amplitude at a relatively high frequency near 3.58 MHz, approximately ⅔ × 3.58 MHz (i.e., 2.4 MHz), while providing effective 3.58 MHz trapping. It should also be noted that while the time intervals $T_1$, $T_2+T_3$ and $T_4$ were selected to be equal for purposes of example, it may be desirable to select these time intervals to be unequal. For example, it may be desirable to select $T_2+T_3$ to equal 110 nanoseconds and select $T_1$ and $T_4$ equal to 140 nanoseconds. In this case, the amplitude versus frequency characteristic associated with $v_o$ will have a value substantially 0 at approximately 4.1 MHz, while having peak amplitude at approximately ⅔ × 3.58 MHz (i.e., 2.4 MHz). Thus, the signal processing apparatus of FIG. 1 may be modified so that frequency components in the range of the chrominance and sound signals of the video signal are relatively attenuated while relatively high frequency components of the luminance signals may be relatively increased in amplitude.

The amplitude transitions of the output signal $v_o$ of signal processing unit 36 of FIG. 1 contain both a preshoot and an overshoot. These preshoots and overshoots serve to accentuate the amplitude transitions of $v_o$. Furthermore, the phase versus frequency transfer characteristics are related to the preshoots and overshoots. For example, a linear phase versus frequency transfer characteristic corresponds to the formation of equal preshoots and overshoots. The preshoots and overshoots are controlled by the signal formed by the summation of amplitude controlled signals associated with taps 112a and 112d. Therefore, although the predetermined gain values of amplitude controlling means 114a and 114d were chosen to be equal and time intervals $T_1+T_2$ and $T_3+T_4$ were chosen to be equal, resulting in a linear phase versus frequency transfer characteristic as manifested by equal preshoots and overshoots, the amplitude controlled signals associated with taps 114a and 114d may be controlled to produce unequal preshoots and overshoots to compensate for phase versus frequency non-linearities in other portions of the video signal processing system.

Figure 5:
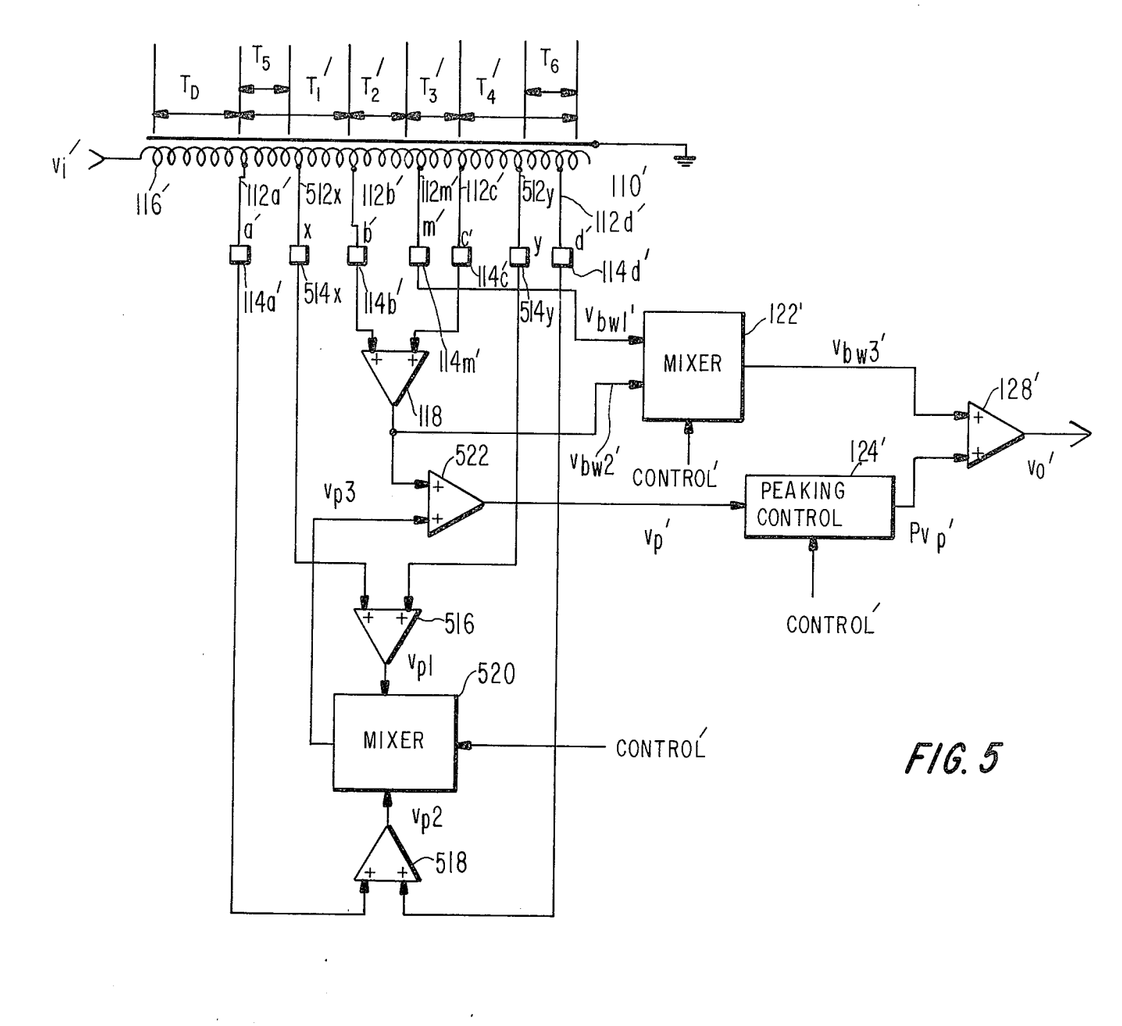
FIG. 5 shows a schematic diagram of another embodiment of the present invention useful in the general arrangement of a color television receiver shown in FIG. 1.

It may be desirable to change the location in frequency of the peak amplitude of amplitude versus frequency transfer characteristics of the luminance channel of a television signal processing apparatus. FIG. 5 is the schematic of a signal processing unit useful in luminance channel 16 of FIG. 1 for controlling the bandwidth and peaking characteristics of luminance channel 16 which is similar to signal processing unit 36 of FIG. 1 and which, in addition, includes provisions for controlling the location in frequency of the peak amplitude of its amplitude versus frequency transfer characteristic. The primed reference numbers and letters of FIG. 5 identify similar components and signals of signal processing unit 36 of FIG. 1. The modifications of signal processing unit 36 of FIG. 1 to form the signal processing unit of FIG. 5 are identified by reference numbers in the 500 series in FIG. 5. Because of the similarities between the signal processing unit of FIG. 5 and signal processing unit 36 of FIG. 1, only the differences between the two apparatus will be described in detail. The similar portions of the two apparatus are formed and operate in the same manner.

Two additional taps, $512x$ and $512y$, are coupled to delay line $110'$ to form delayed video signals $x$ and $y$ for determining the location of the peak amplitude of the amplitude versus frequency transfer characteristic of the signal processing unit of FIG. 5. Delayed video signal $x$ is delayed by a time interval $T_D' + T_5$ in relation to input video signal $v_i'$, i.e., a delay of $T_5$ greater than the delay of delayed video signal $a'$. Delayed video signal $y$ is delayed by a time interval $T_D' + T_1' + T_2' + T_3' + T_4' - T_6$ in relation to $v_i'$, i.e., a delay of $T_6$ less than the delay of delayed video signal $d'$. The time interval $T_5$ is less than the time interval $T_1'$. The time interval $T_6$ is less than the time interval $T_4'$.

Delayed video signals $x$ and $y$ are respectively coupled to amplitude controlling means $514x$ and $514y$. Amplitude controlling means $514x$ and $514y$ may be formed in a similar manner to amplitude controlling means $114a'$, $114b'$, $114m'$, $114c'$ and $114d'$. The amplitude controlled output signals of amplitude controlling means $514x$ and $514y$ are coupled to summing circuit $516$, where they are algebraically added to form $v_{p1}$. Similarly, the amplitude controlled output signals of amplitude controlling means $114a'$ and $114d'$ are coupled to summing circuit $518$ where they are algebraically added to form $v_{p2}$. Both summing circuits $516$ and $518$ may be formed in a similar manner to summing circuit $118'$. As will be seen with reference to FIG. 6, the amplitude versus frequency transfer characteristic associated with $v_{p1}$ has a peak amplitude at a frequency higher than the frequency location of the peak amplitude of the amplitude versus frequency transfer characteristic associated with $v_{p2}$.

Signals $v_{p1}$ and $v_{p2}$ are coupled to mixer unit $520$ together with a control signal such as the chrominance bandpass signal or color killer signal. Mixer unit $520$ serves to combine controllable amplitude portions of $v_{p1}$ and $v_{p2}$ to form $v_{p3}$ in response to the control signal. Mixer unit $520$ may be formed in a similar manner to mixer unit $112'$. Mixer unit $520$ may be arranged to switch $v_{p3}$ between $v_{p1}$ and $v_{p2}$ in response to the control signal representing the amplitude of undesirable signals present in the luminance channel. Thus, for example, when the control signal represents a relatively large amount of color information, $v_{p3}$ will equal $v_{p2}$, so that the signals processed by the signal processing unit of FIG. 5 will be peaked at a relatively low frequency to avoid the generation of undesirable patterns due to the accentuation of undesirable signals present in the luminance channel. Conversely, when the control signal represents a relatively small amount of color information, $v_{p3}$ will equal $v_{p1}$, so that the signals processed by the signal processing unit of FIG. 5 will be peaked at a relatively high frequency.

Signals $v_{p3}$ and $v_{bw2}'$ are coupled to summing circuit $522$, where $v_{p3}$ is algebraically subtracted from $v_{bw2}'$ to form $v_p'$. Summing circuit $522$ may be formed in a manner similar to summing circuits $516$ and $518$.

The operation of the signal processing apparatus of FIG. 5 will be described by way of example wherein taps $112a'$, $512x$, $112b'$, $112c'$, $512y$ and $112d'$ are symmetrically located around $112m'$ and time intervals $T_1'$, $T_2' + T_3'$ and $T_4'$ are all equal to $1/2f_2$), where $f_2$ is the frequency of a signal component of the composite video signal, $v_i'$, which may undesirably be present in the luminance channel. Further, by way of example, the predetermined gain values of amplitude controlling means $114a'$, $514x$, $114b'$, $114m'$, $114c'$, $514y$ and $114d'$ have respective relative values of ½, ½, ½, 1, ½, ½ and ½.

Figure 6:
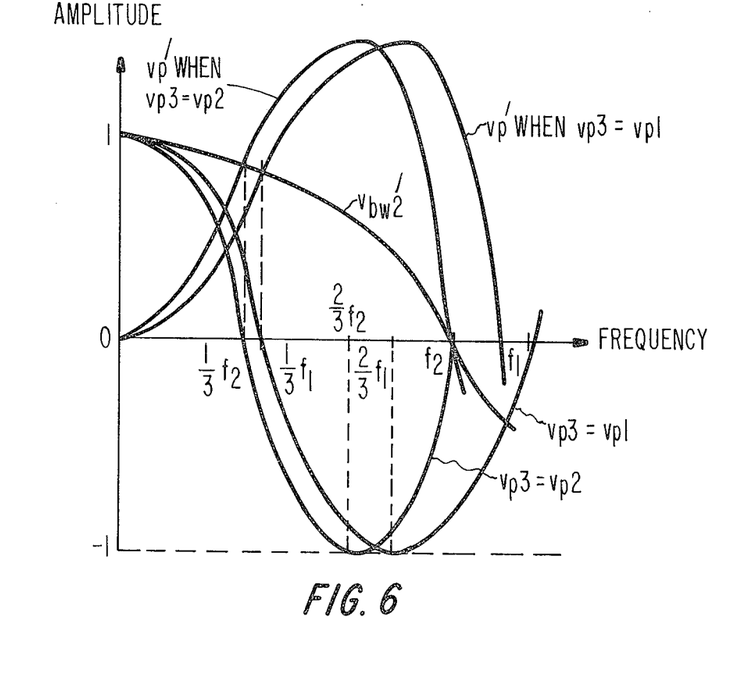
FIG. 6 shows a graphical represenation of various amplitude versus frequency characteristics associated with the embodiment of the present invention shown in FIG. 5.

In FIG. 6, there are shown graphical representations of amplitude versus frequency transfer characteristics associated with $v_{p3}$, $v_{bw2}'$ and $v_p'$. The amplitude versus frequency transfer characteristic associated with $v_{bw2}'$ is a cosine function having a recurrence rate of $4f_2$. The amplitude versus frequency transfer characteristic associated with $v_{p3}$ is shown for the conditions when $v_{p3}$ is equal to $v_{p1}$ and when $v_{p3}$ is equal to $v_{p2}$. When $v_{p3}$ is equal to $v_{p2}$, the amplitude versus frequency transfer characteristic associated with $v_{p3}$ is a cosine function having a recurrence rate of $4f_2/3$ and a minimum amplitude at $2f_2/3$. When $v_{p3}$ is equal to $v_{p1}$, the amplitude versus frequency transfer characteristic associated with $v_{p3}$ is a cosine function having a recurrence rate of $4f_1/3$ and a minimum amplitude of $2f_1/3$. The frequency $f_1$ is determined by the spacing in time between the delayed video signals $x$ and $y$. Specifically, the time delay between delayed video signals $x$ and $y$ is equal of $3f_1/2$.

The amplitude versus frequency transfer characteristic associated with $v_p'$ is formed by subtracting the amplitude versus frequency transfer characteristic associated with $v_{p3}$ from the amplitude versus frequency transfer characteristic associated with $v_{bw2}'$. The amplitude versus frequency transfer characteristic associated with $v_p'$ is shown when $v_{p3}$ is equal to $v_{p1}$ and when $v_{p3}$ is equal to $v_{p2}$. The peak amplitude of the amplitude versus frequency transfer characteristic associated with $v_p'$ when $v_{p3}$ is equal to $v_{p2}$ is located approximately at $2f_2/3$. The peak amplitude of the amplitude versus frequency transfer characteristic associated with $v_p'$ when $v_{p3}$ is equal to $v_{p1}$ is located at $2f_1/3$, a frequency higher than $2f_2/3$.

Thus, since $v_p'$ determines peaking characteristics of the signal processing unit of FIG. 5, the location of the peak amplitude of the amplitude versus frequency transfer characteristics of the signal processing unit of FIG. 5 may be controlled by controlling the formation of $v_{p3}$. Specifically, when a control signal representing the amount of color information present in the video signal indicates a relatively large amount of color information, $v_{p3}$ primarily comprises the combination of two delayed video signals ($x$ and $y$) having an amplitude versus frequency transfer characteristic with a relatively low frequency peak amplitude. When the signal representing the amount of color information present in the video signal indicates a relatively small amount of color information, $v_{p3}$ primarily comprises the combination of two delayed video signals ($a'$ and $d'$) having an amplitude versus frequency transfer characteristic with a relatively high frequency peak amplitude.

What is claimed is:
1. Apparatus for processing television video signals, comprising:
   a source of video signals;
   signal delaying means coupled to said source of video signals;
   a plurality of signal coupling means coupled to said signal delaying means for developing a plurality of delayed video signals;
   first means for combining at least a first and a second of said delayed video signals being spaced apart in time by a time interval substantially equal to NT/2, where T is the period of a predetermined signal component supplied by said source and N is an integer greater than one, to produce a first combined signal;
   means for deriving a first bandwidth determining signal from at least a third of said delayed video signals being located in time between said first and second delayed video signals;
   means for deriving a second bandwidth determining signal from at least a fourth and a fifth of said delayed video signals each being located in time between said first and second delayed video signals;
   second means for combining one of said bandwidth determining signals with said first combined signal to produce a second combined signal;
   means for selectively combining said first and second bandwidth determining signals to produce a third bandwidth determining signal including controlled amplitude portions of said first and second bandwidth determining signals; and
   third means for combining said third bandwidth determining signal and said second combined signal to produce an output signal.

2. The apparatus recited in claim 1 wherein said means for selectively combining said first and second bandwidth determining signals is responsive to a first control signal for controlling the amplitudes of said first and second bandwidth determining signals.

3. The apparatus recited in claim 2 wherein the controlled amplitude portions of said first and second bandwidth determining signals are controlled in inverse relationship to one another in accordance with said first control signal.

4. The apparatus recited in claim 3 wherein said first means provides the sum of said first and second delayed video signals.

5. The apparatus recited in claim 4 wherein said means for deriving a second bandwidth determining signal provides the sum of said fourth and fifth delayed video signals.

6. The apparatus recited in claim 5 wherein said second means provides the difference between said second bandwidth determining signal and said first combined signal.

7. The apparatus recited in claim 6 wherein said third means provides the sum of said third bandwidth determining signal and said second combined signal.

8. The apparatus recited in claim 7 wherein said first control signal is representative of the amplitude of color information in said video signal and said controlled amplitude portion of said first bandwidth determining signal is controlled in inverse relationship to the amplitude of color information and said controlled amplitude portion of said second bandwidth determining signal is controlled in direct relationship to the amplitude of color information.

9. The apparatus recited in claim 8 wherein said means for providing said third bandwidth determining signal selectively provides one of said first and second bandwidth determining signals.

10. The apparatus recited in claim 8 wherein said second means includes means for controlling the amplitude of said second combined signal.

11. The apparatus recited in claim 10 wherein said means for controlling the amplitude of said second combined signal is responsive to a second control signal representative of the amplitude of color information present in said video signal, the amplitude of said second combined signal being controlled in inverse relationship to the amplitude of color information in said video signal.

12. The apparatus recited in claim 7 wherein said first means includes:
   fourth means for adding said first and second delayed video signals to produce a third combined signal;
   fifth means for adding a sixth and a seventh delayed video signal being spaced apart by a time interval less than NT/2 to produce a fourth combined signal; and
   means for selectively combining said third and fourth combined signals to produce said first combined signal including controlled amplitude portions of said third and fourth combined signals.

13. The apparatus recited in claim 12 wherein said means for selectively combining said third and fourth combined signals is responsive to a third control signal for controlling the amplitudes of said third and fourth combined signals.

14. The apparatus recited in claim 13 wherein the controlled amplitude portions of said third and fourth combined signals are controlled in inverse relationship to one another in accordance with said third control signal.

15. The apparatus recited in claim 14 wherein said first control signal represents the amplitude of color information in said video signal and said controlled amplitude portion of said first bandwidth determining signal is controlled in inverse relationship to the amplitude of color information and said controlled amplitude portion of said second bandwidth determining signal is controlled in direct relationship to the amplitude of color information, and wherein said third control signal represents the amplitude of color information in said video signal and said controlled amplitude portion of said third combined signal is controlled in direct relationship to the amplitude of color information and controlled amplitude portion of said fourth combined signal in inverse relationship to the amplitude of color information.

16. The apparatus recited in claim 15 wherein said means for selectively combining said third and fourth combined signals selectively provides one of said third and fourth combined signals.

17. The apparatus recited in claim 16 wherein said means for providing said third bandwidth determining signal selectively provides one of said first and second bandwidth determining signals.

18. The apparatus recited in claim 1 wherein said video signals include at least chrominance and luminance signals and said signal delaying means include a portion for equalizing the time delays of said chrominance and luminance signals.

* * * * *

UNITED STATES PATENT OFFICE
CERTIFICATE OF CORRECTION

PATENT NO. : 3,938,181
DATED : February 10, 1976
INVENTOR(S) : JACK AVINS

It is certified that error appears in the above-identified patent and that said Letters Patent are hereby corrected as shown below:

Col. 5, line 1, "represenation" should be -- representation --

Col. 9, line 49, "$e^{-j\ t}$" should be -- $e^{-j\omega t}$ --

Col 14, line 12, "$1/2f_2)$" should be -- $1/2f_2$ --

Col. 14, line 20, "represenation" should be -- representation --

Col. 14, line 31, "$2f_2 13$" should be -- $2f_2/3$ --

Signed and Sealed this eighteenth Day of May 1976

[SEAL]

Attest:

RUTH C. MASON
Attesting Officer

C. MARSHALL DANN
Commissioner of Patents and Trademarks